US011640090B2

(12) United States Patent
Nakakomi et al.

(10) Patent No.: US 11,640,090 B2
(45) Date of Patent: May 2, 2023

(54) DISPLAY DEVICE

(71) Applicant: Japan Display Inc., Tokyo (JP)

(72) Inventors: Masaru Nakakomi, Tokyo (JP);
Tomokazu Ishikawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/655,449

(22) Filed: Mar. 18, 2022

(65) Prior Publication Data

US 2022/0299830 A1 Sep. 22, 2022

(30) Foreign Application Priority Data

Mar. 22, 2021 (JP) .............................. JP2021-047325

(51) Int. Cl.
*G02F 1/1362* (2006.01)
*G02F 1/1333* (2006.01)
*G06F 3/044* (2006.01)

(52) U.S. Cl.
CPC .... *G02F 1/136286* (2013.01); *G02F 1/13338* (2013.01); *G02F 1/136209* (2013.01); *G06F 3/0446* (2019.05)

(58) Field of Classification Search
CPC .................................................. G02F 1/1362
See application file for complete search history.

(56) References Cited

U.S. PATENT DOCUMENTS

| 2013/0235294 | A1* | 9/2013 | Nomura | G02F 1/13394 438/30 |
| 2015/0060832 | A1* | 3/2015 | Ito | H01L 27/3258 257/40 |
| 2017/0336898 | A1* | 11/2017 | Maede | G02F 1/134309 |
| 2019/0157304 | A1* | 5/2019 | Miyamoto | H01L 27/1248 |

FOREIGN PATENT DOCUMENTS

| JP | 2013-186148 A | 9/2013 |
| JP | 2019-95578 A | 6/2019 |

* cited by examiner

*Primary Examiner* — Sang V Nguyen
(74) *Attorney, Agent, or Firm* — Maier & Maier, PLLC

(57) ABSTRACT

According to one embodiment, a display device including a first substrate including a first insulating film and a second insulating film that includes a band-shaped first thick film portion, an island-shaped second thick film portion, a first contact hole penetrating the first thick film portion, and a second contact hole penetrating the second thick film portion, a first thickness of the first thick film portion and a second thickness of the second thick film portion are larger than a film thickness of the second insulating film between the first and second thick film portions, and a second substrate comprises a spacer overlapping the first thick film portion.

11 Claims, 15 Drawing Sheets

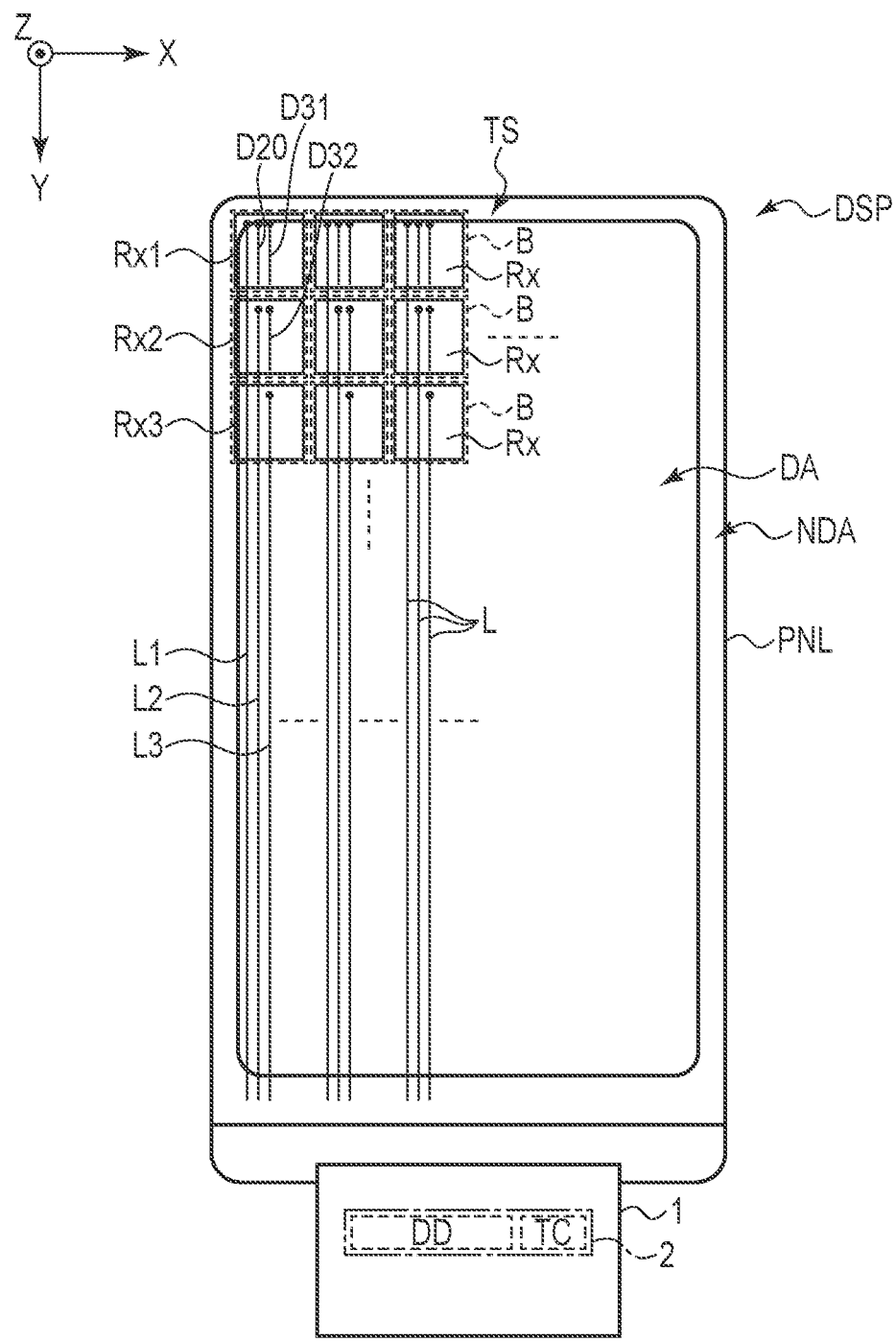
F I G. 2

DISPLAY DEVICE

CROSS-REFERENCE TO RELATED APPLICATIONS

This application is based upon and claims the benefit of priority from Japanese Patent Application No. 2021-047325, filed Mar. 22, 2021, the entire contents of which are incorporated herein by reference.

FIELD

Embodiments described herein relate generally to a display device.

BACKGROUND

In recent years, various display devices with built-in touch sensors have been proposed. In one example, a display device is disclosed in which a plurality of electrodes formed on a display panel play the role of sensor electrodes when in a touch sensing mode and play the role of common electrodes when in a display mode. As a touch sensing method, either a mutual-capacitive method or a self-capacitive method is applied. In the touch sensing mode, sensing is performed by applying a touch drive voltage to the sensor electrode through a signal line.

In a display device equipped with a touch sensor in which island-shaped sensor electrodes are lined up in a matrix, a structure is known in which the pixel electrode is connected to a semiconductor layer via three layers of electrodes, which are a drain electrode on the same layer as a signal line, a metal electrode on the same layer as a metal line, and a transparent electrode on the same layer as the sensor electrode.

The display device is also equipped with a spacer to maintain a cell gap between first and second substrates. For example, a configuration in which the spacer disposed on the first substrate and the spacer disposed on the second substrate intersect and face each other is known. This configuration can suppress the occurrence of scraping, etc., of an alignment film by the spacer.

BRIEF DESCRIPTION OF THE DRAWINGS

FIG. 2 is a plan view showing a configuration example of a touch sensor.

DETAILED DESCRIPTION

Figure 1:
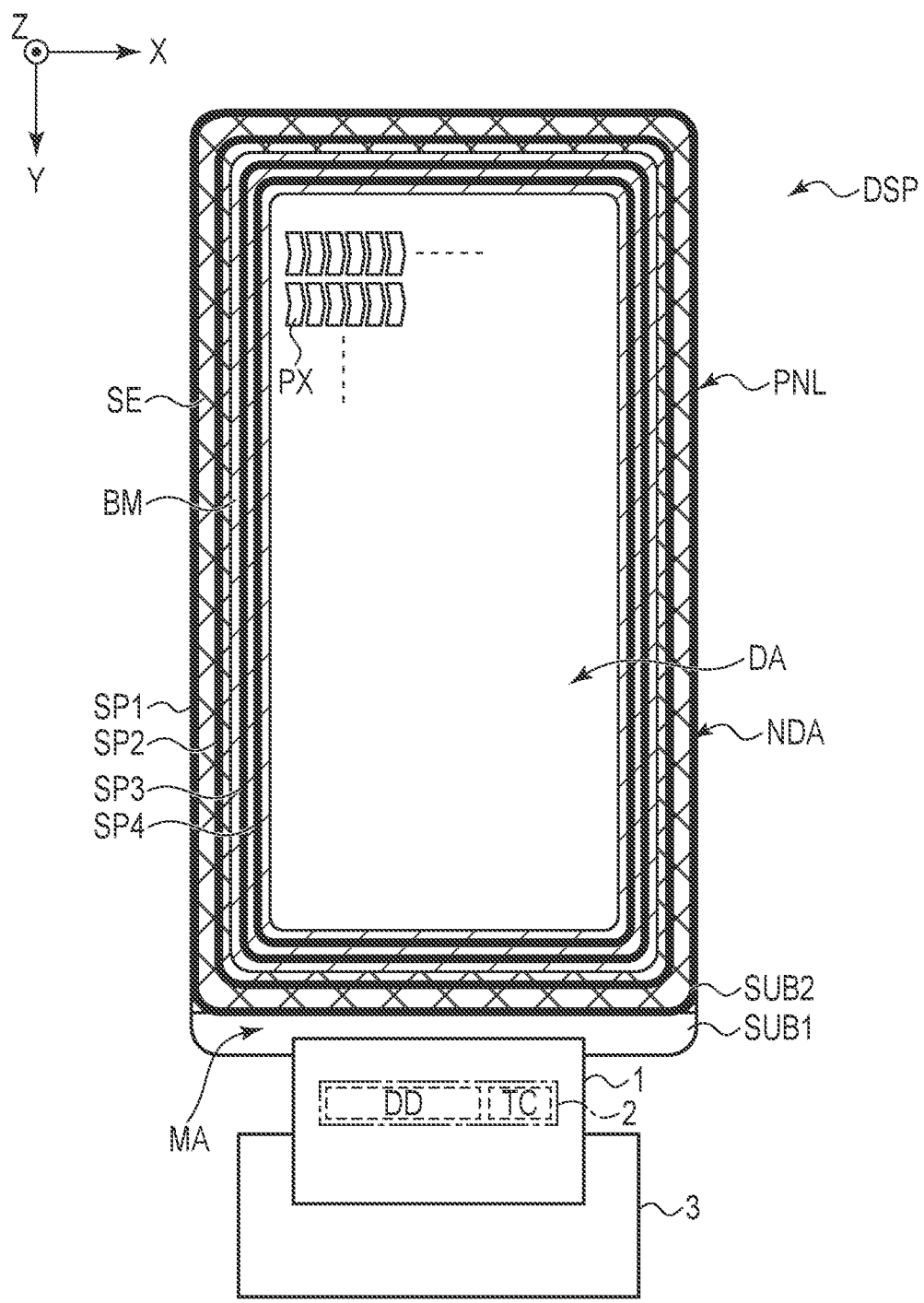
FIG. 1 is a plan view showing the appearance of a display device of the present embodiment.

In general, according to one embodiment, a display device comprising a first substrate, a second substrate facing the first substrate, and a liquid crystal layer located between the first substrate and the second substrate, wherein the first substrate comprises a scanning line extending in a first direction, a first signal line extending in a second direction intersecting the first direction, a first insulating film covering the first signal line, a first metal line disposed on the first insulating film and extending in a manner overlapping the first signal line, an island-shaped metal electrode disposed on the first insulating film and formed by the same material as the first metal line, a second insulating film covering the first metal line and the metal electrode, and a common electrode disposed on the second insulating film, the second insulating film comprises, a band-shaped first thick film portion extending in the first direction and overlapping the scanning line and the metal electrode, an island-shaped second thick film portion overlapping the first metal line and the common electrode, a first contact hole penetrating the first thick film portion to the metal electrode, and a second contact hole penetrating the second thick film portion to the first metal line, a first thickness of the first thick film portion and a second thickness of the second thick film portion are larger than a film thickness of the second insulating film between the first thick film portion and the second thick film portion, and the second substrate comprises a spacer that protrudes toward the first substrate and overlaps the first thick film portion.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

First, a display device DSP according to the present embodiment will be described in detail. In the present embodiment, a case in which the display device DSP is a liquid crystal display is described.

FIG. 1 is a plan view showing the appearance of a display device of the present embodiment. In the following descriptions, for example, a first direction X, a second direction Y and a third direction Z are orthogonal to each other, but they may intersect at an angle other than 90 degrees. The first direction X and the second direction Y correspond to the directions parallel to a main surface of a substrate that constitutes the display device DSP. The third direction Z is equivalent to a thickness direction of the display device DSP. In the following descriptions, a direction forwarding a tip of an arrow indicating the third direction Z is referred to as "upward" and a direction forwarding oppositely from the tip of the arrow is referred to as "downward". Further, when it is assumed that there is an observation position to observe the display device DSP on a tip side of an arrow in a third direction Z, viewing from this observation position toward the X-Y plane defined by the first direction X and the second direction Y is referred to as a planar view.

Here, a plan view of the display device DSP in the X-Y plane is shown. The display device DSP comprises a display panel PNL, a flexible printed circuit board 1, an IC chip 2, and a circuit board 3.

The display panel PNL is a liquid crystal display panel and comprises a first substrate SUB1, a second substrate SUB2, a seal SE, a light-shielding layer BM, spacers SP1 to SP4, and a liquid crystal layer LC to be described later. The display panel PNL also comprises a display section DA that displays images and a frame-shaped non-display section NDA that surrounds the display section DA. The second substrate SUB2 faces the first substrate SUB1. The first substrate SUB1 includes a mounting section MA that is extended in the second direction Y more than the second substrate SUB2. The first substrate SUB 1 is a semiconductor substrate including a plurality of thin-film transistors and may be referred to as an array substrate. The second substrate SUB2 includes a color filter layer CF as described below, and may be referred to as a color filter substrate.

The seal SE is located in the non-display section NDA and adheres the first substrate SUB1 and the second substrate SUB2. The light-shielding layer BM is located in the non-display section NDA. The seal SE is located at a position superposing the light-shielding layer BM in planar view. In FIG. 1, an area in which the seal SE is disposed and an area in which the light-shielding layer BM is disposed are shown by different diagonal lines, and an area in which the seal SE and the light-shielding layer BM superpose is shown by cross-hatching. The light-shielding layer BM is provided on the second substrate SUB2.

The spacers SP1 to SP4 are all located in the non-display section NDA. The spacer SP1 is located at the outermost periphery of the display panel PNL. The spacer SP2 is located more on the display section DA side than the spacer SP1. The spacers SP1 and SP2 are superposed on the seal SE. The spacers SP3 and SP4 are located more on the display section DA side than the seal SE.

The display section DA is located inside an area surrounded by the light-shielding layer BM. The display panel PNL comprises a plurality of pixels PX arranged in a matrix in a first direction X and the second direction Y in the display section DA.

The flexible printed circuit board 1 is mounted on the mounting section MA and connected to the circuit board 3. The IC chip 2 is mounted on the flexible printed circuit board 1. Note that the IC chip 2 may be mounted on the mounting section MA. The IC chip 2 has a built-in display driver DD that outputs signals necessary for displaying images in a display mode that displays images. In the example shown in the drawing, the IC chip 2 has a built-in touch controller TC that controls a touch sensing mode to detect the approach or contact of an object to the display device DSP. In the drawing, the IC chip 2 is shown with a dashed line, and the display driver DD and the touch controller TC are shown with dotted lines.

The display panel PNL of the present embodiment may be one of a transmissive type provided with a transmissive display function that displays images by selectively transmitting light from the rear side of the first substrate SUB1, a reflective type provided with a reflective display function that displays images by selectively reflecting light from the front side of the second substrate SUB2, and a semi-transmissive type provided with the transmissive display function and the reflective display function.

The detailed configuration of the display panel PNL is omitted here. However, the display panel PNL may be provided with any of the following configurations corresponding to a display mode that uses a horizontal electric field along the substrate main surface, a display mode that uses a vertical electric field along the normal line of the substrate main surface, a display mode that uses a tilted electric field inclined in an oblique direction to the substrate main surface, and, further, a display mode that uses a combination of the above horizontal electric field, vertical electric field, and tilted electric field as appropriate. The substrate main surface here is a surface parallel to the X-Y plane defined by the first direction X and the second direction Y.

FIG. 2 shows a plan view of a configuration example of a touch sensor TS. Here, a self-capacitive type touch sensor TS is described; however, the touch sensor TS may also be a mutual-capacitive type.

The touch sensor TS comprises a plurality of sensor electrodes Rx (Rx1, Rx2 . . . ) arranged in a matrix and a plurality of sensor lines L (L1, L2 . . . ). The plurality of sensor electrodes Rx are located in the display section DA and are arranged in a matrix in the first direction X and the second direction Y. One sensor electrode Rx configures one sensor block B. A sensor block B is the smallest unit capable of touch sensing. The plurality of sensor lines L extend along the second direction Y and are lined up in the first direction X, respectively, in the display section DA. Each of the sensor lines L is provided, for example, at a position superposed on the signal line S which will be described later. Each of the sensor lines L is pulled out to the non-display section NDA and electrically connected to the IC chip 2 via the flexible printed circuit board 1.

Here, the relationship between the sensor lines L1 to L3 lined up in the first direction X and the sensor electrodes Rx1 to Rx3 lined up in the second direction Y will be focused. The sensor line L1 is superposed on the sensor electrodes Rx1 to Rx3, and is electrically connected to the sensor electrode Rx1.

The sensor line L2 is superposed on the sensor electrodes Rx2 and Rx3, and is electrically connected to the sensor electrode Rx2. A dummy line D20 is separated from the sensor line L2. The dummy line D20 is superposed on the sensor electrode Rx1 and is electrically connected to the sensor electrode Rx1. The sensor line L2 and the dummy line D20 are located on the same signal line.

The sensor line L3 is superposed on the sensor electrode Rx3 and is electrically connected to the sensor electrode Rx3. A dummy line D31 is superposed on the sensor electrode Rx1 and is electrically connected to the sensor electrode Rx1. A dummy line D32 is separated from dummy line D31 and the sensor line L3. The dummy line D32 is superposed on the sensor electrode Rx2 and is electrically connected to the sensor electrode Rx2. The sensor line L3 and the dummy lines D31 and D32 are located on the same signal line.

In the touch sensing mode, the touch controller TC applies a touch drive voltage to the sensor line L. As a result, the touch drive voltage is applied to the sensor electrode Rx, and sensing is performed at the sensor electrode Rx. A sensor signal corresponding to the sensing result at the sensor electrode Rx is output to the touch controller TC via the sensor line L. The touch controller TC or an external host detects the presence or absence of the approach or contact of an object to the display device DSP and the position coordinates of the object based on the sensor signal.

Note that, in the display mode, the sensor electrode Rx functions as a common electrode to which a common voltage (Vcom) is applied. The common voltage is applied via the sensor line L from the voltage supply unit included in, for example, the display driver DD.

Figure 3:
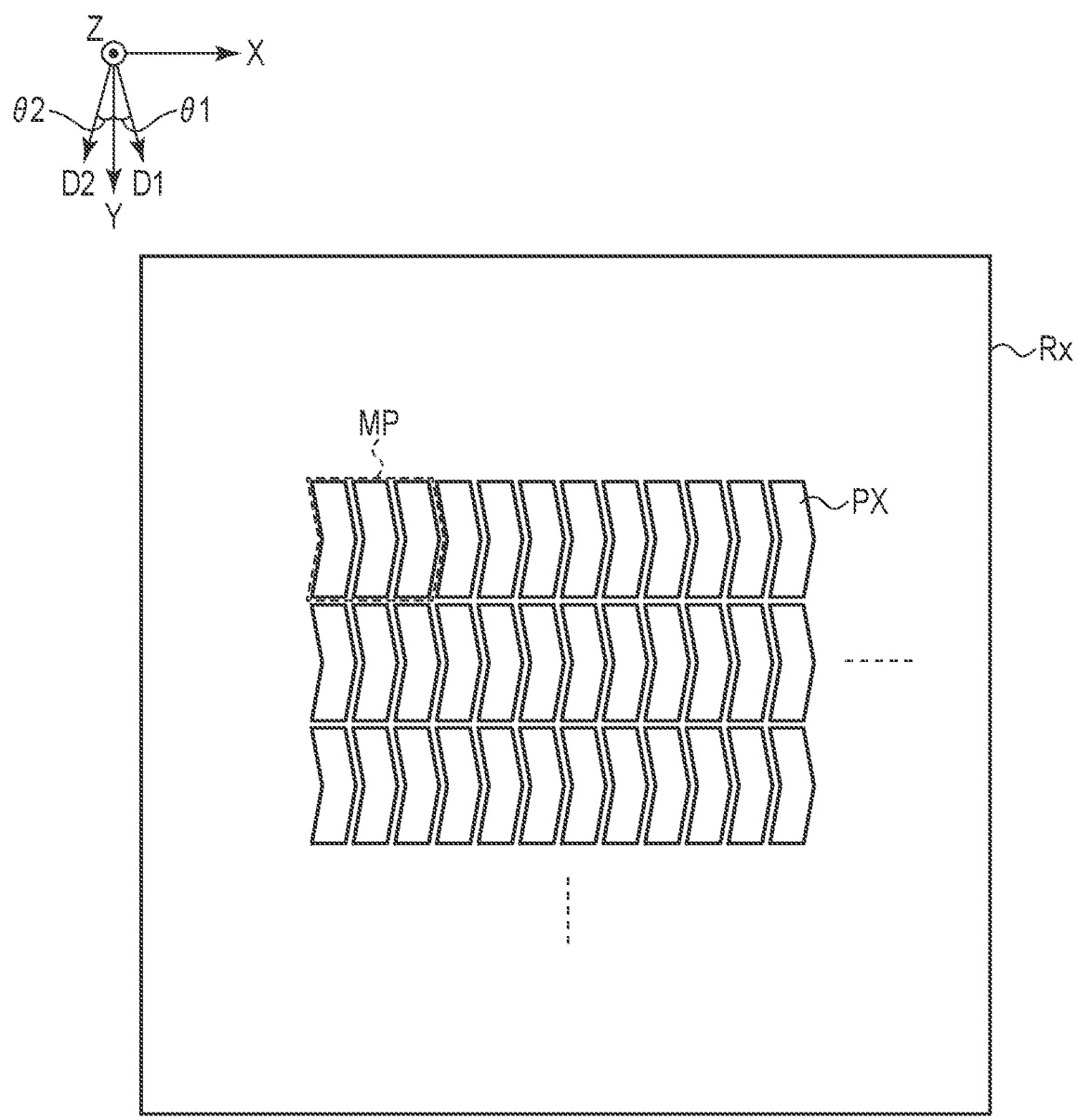
FIG. 3 is a plan view showing the relationship between a pixel and a sensor electrode shown in FIG. 2.

FIG. 3 is a plan view showing the relationship between the pixel PX and the sensor electrode Rx shown in FIG. 2. In FIG. 3, a direction that intersects the second direction Y counterclockwise at an acute angle is defined as a direction D1, and a direction that intersects the second direction Y clockwise at an acute angle is defined as a direction D2. Note that an angle θ1 between the second direction Y and the direction D1 is almost the same as an angle θ2 between the second direction Y and the direction D2.

One sensor electrode Rx is disposed over a plurality of pixels PX. Each pixel PX includes a portion extending along the direction D1 and a portion extending along the direction D2. Note that the pixel PX here indicates the smallest unit that can be individually controlled according to a pixel signal, and may sometimes be referred to as a sub-pixel. The smallest unit to realize color display may sometimes be referred to as a main pixel MP. The main pixel MP is configured by comprising a plurality of sub-pixels PX that display different colors from each other. In one example, the main pixel MP comprises a red pixel that displays red, a green pixel that displays green, and a blue pixel that displays blue as sub-pixels PX. The main pixel MP may also comprise a white pixel that displays white color.

In one example, 60 to 70 main pixels MP are disposed along the first direction X and 60 to 70 main pixels MP are disposed along the second direction Y on one sensor electrode Rx.

Figure 4:
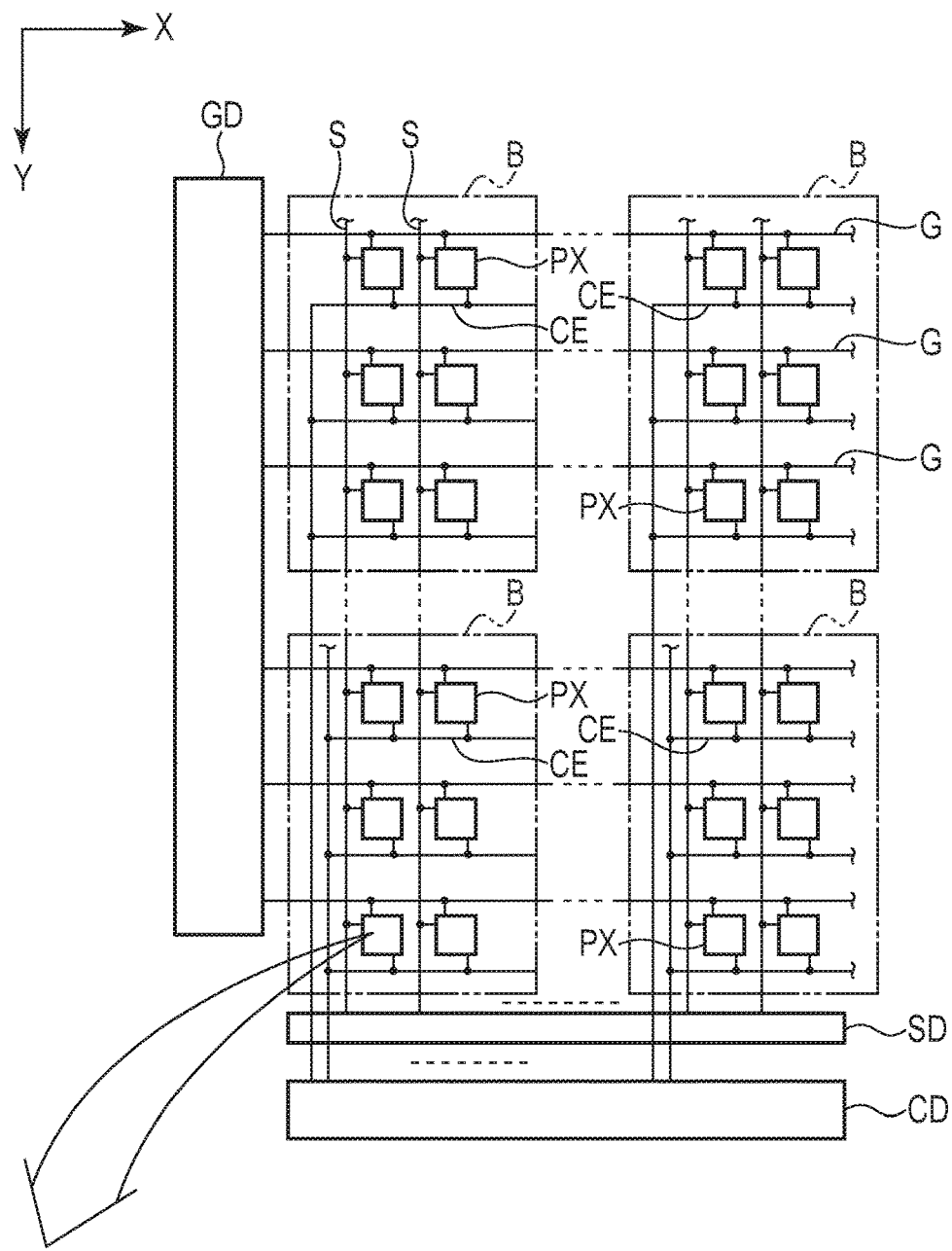
FIG. 4 shows a basic configuration and an equivalent circuit of a pixel.
Figure 4:
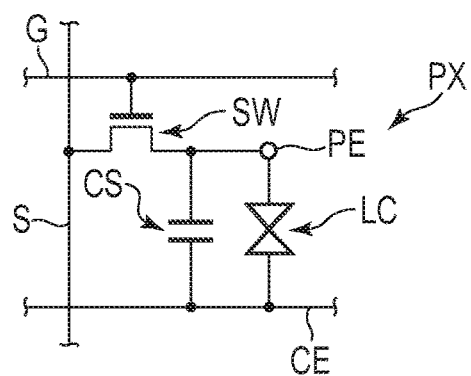

FIG. 4 shows a basic configuration and equivalent circuit of the pixel PX.

A plurality of scanning lines G are connected to a scanning line drive circuit GD. A plurality of signal lines S are connected to a signal line drive circuit SD. Note that the scanning lines G and the signal lines S do not necessarily have to extend in a straight line, and some of them may be bent. For example, the signal line S is assumed to extend in the second direction Y even if a part of it is bent.

A common electrode CE is provided for each sensor block B. The common electrodes CE are connected to a voltage supply unit CD of the common voltage (Vcom) and are arranged over a plurality of pixels PX. Each of the common electrodes CE is also connected to the touch controller TC as described above, and form the sensor electrode Rx to which the touch drive voltage is applied in the touch sensing mode.

Each pixel PX comprises a switching element SW, a pixel electrode PE, a common electrode CE, and a liquid crystal layer LC, etc. The switching element SW is configured by a thin-film transistor (TFT), for example, and is electrically connected to the scanning line G and the signal line S. The scanning line G is connected to the switching element SW in each of the pixels PX lined up in the first direction X. The signal line S is connected to the switching element SW in each of the pixels PX lined up in the second direction Y. The pixel electrode PE is electrically connected to the switching element SW. Each of the pixel electrodes PE faces the common electrode CE, and drives the liquid crystal layer LC by an electric field generated between the pixel electrode PE and the common electrode CE. A holding capacitor CS is formed, for example, between an electrode of the same potential as the common electrode CE and an electrode of the same potential as the pixel electrode PE.

Figure 5:
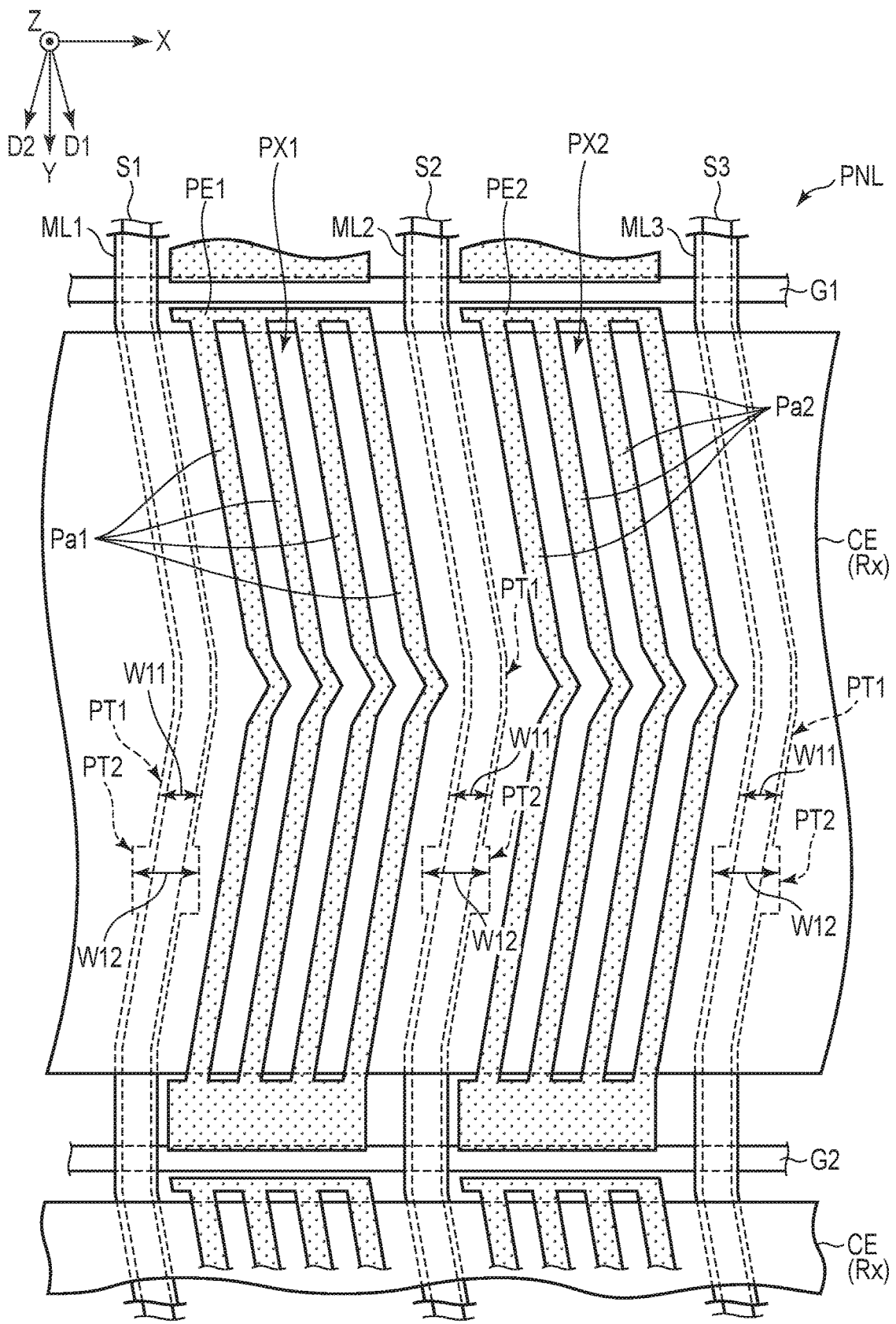
FIG. 5 is a plan view showing an example of a pixel layout.

FIG. 5 is a plan view showing an example of a pixel layout.

The scanning lines G1 and G2 each extend linearly along the first direction X, and are lined up at intervals in the second direction Y. The signal lines S1 to S3 each extend generally along the second direction Y, and are lined up at intervals in the first direction X. The display panel PNL comprises metal lines ML1 to ML3 extending generally along the second direction Y and lined up at intervals in the first direction X. The metal lines ML1 to ML3 extend in a manner overlapping the signal lines S1 to S3, respectively. Each of the metal lines ML1 to ML3 has a first portion PT1 extending generally in the second direction Y and a second portion PT2 having a width W12 larger than a width W11 of the first portion PT1 in the first direction X. The second portion PT2 corresponds to an extended portion that is extended to connect with the common electrode CE.

Pixel electrodes PE1 and PE2 are disposed between the scanning lines G1 and G2. The pixel electrodes PE1 and PE2 are lined up along the first direction X. The pixel electrode PE1 is disposed between the signal lines S1 and S2, and the pixel electrode PE2 is disposed between the signal lines S2 and S3.

The pixel electrodes PE1 and PE2 include strip electrodes Pa1 and Pa2, respectively. Each of the strip electrodes Pa1 and Pa2 has a portion extending along the direction D1 and a portion extending along the direction D2. In the example shown in the drawing, there are four strip electrodes Pa1 and Pa2 respectively. However, the strip electrodes Pa1 and Pa2 may each be three or less, or five or more.

The common electrode CE is disposed over the pixels PX1 and PX2. The common electrode CE is included in one sensor electrode Rx shown in FIG. 2. The common electrode CE is superposed on the signal lines S1 to S3. In the example shown in the drawing, the common electrode CE is not superposed on the scanning lines G1 and G2. The pixel electrodes PE1 and PE2 are superposed on the common electrode CE.

Figure 6:
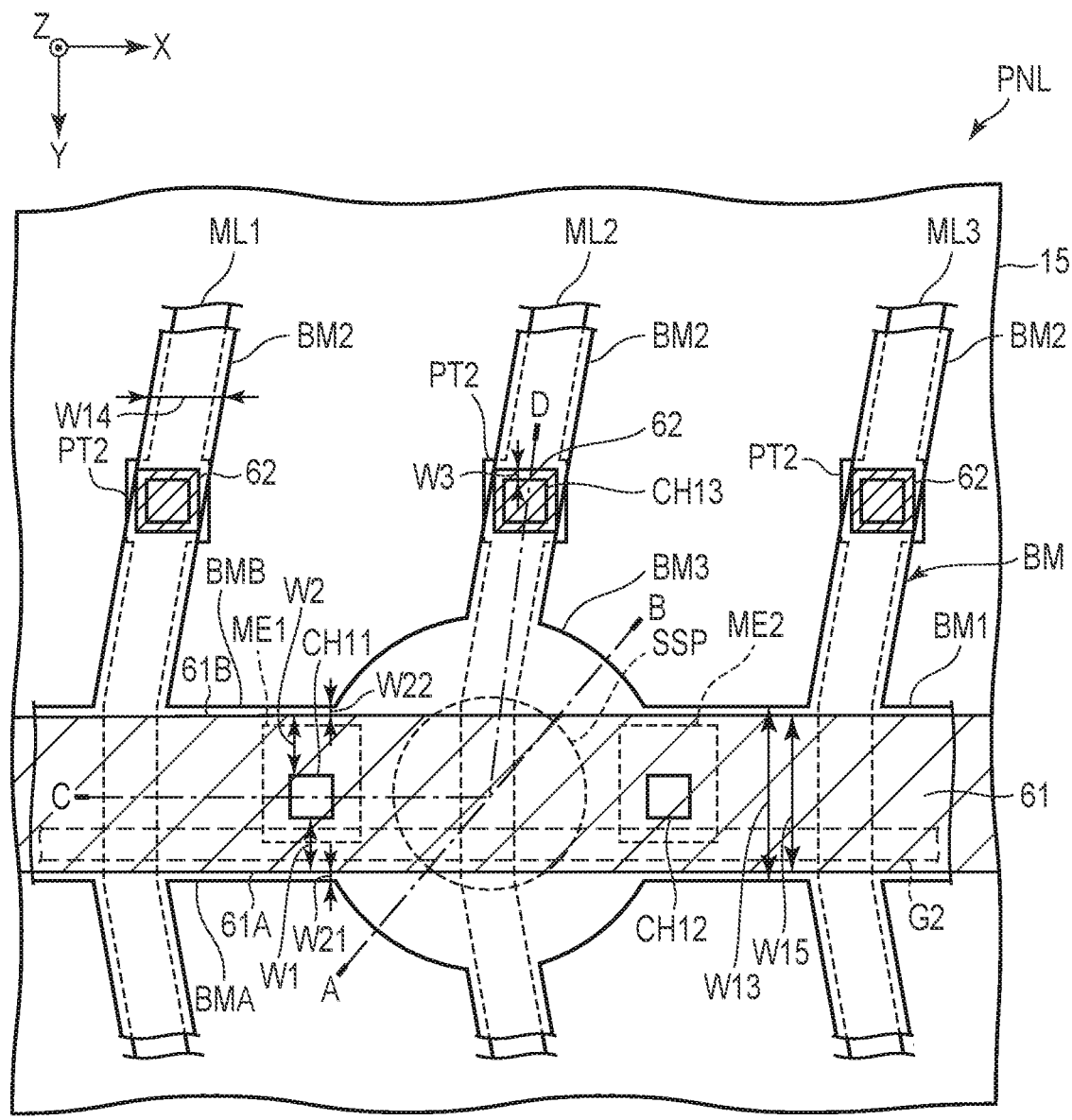
FIG. 6 is a plan view showing the periphery of a subspacer.

FIG. 6 is a plan view showing the periphery of a subspacer SSP. In the example shown in the drawing, the display panel PNL comprises the above-mentioned metal lines ML1 to ML3 and scanning line G2, metal electrodes ME1 and ME2, an insulating film 15, the light-shielding layer BM, and the subspacer SSP.

The metal electrode ME1 is located between the metal line ML1 and the metal line ML2 and is formed in an island shape. The metal electrode ME2 is located between the metal line ML2 and the metal line ML3 and is formed in an island shape.

The insulating film 15 is disposed on almost the entire surface of the display panel PNL. The insulating film 15 comprises a band-shaped first thick film portion 61 extending in the first direction X, and a plurality of island-shaped second thick film portions 62. In FIG. 6, the area where the first thick film portion 61 and the second thick film portion 62 are located is indicated by diagonal lines. The first thick film portion 61 overlaps the scanning line G2 and the metal electrodes ME1 and ME2. The plurality of second thick film portions 62 overlap with the second portion PT2 of the metal lines ML1 to ML3, respectively.

The insulating film 15 has a contact hole (a first contact hole) CH11 overlapping the metal electrode ME1, a contact hole CH12 overlapping the metal electrode ME2, and a contact hole (a second contact hole) CH13 overlapping the second portion PT2. The contact holes CH11 and CH12 are formed in the first thick film portion 61. The contact hole CH13 is formed in the second thick film portion 62.

The first thick film portion 61 includes end portions 61A and 61B extending in the first direction X. The end portion 61A is located on the scanning line G2 side of the contact hole CH11, and the end portion 61B is located on the opposite side of the end portion 61A. A width W1 between the contact hole CH11 and the end portion 61A is 2 μm or more. Similarly, a width W2 between the contact hole CH11 and the end portion 61B is 2 μm or more. In addition, a width W3 between the contact hole CH13 and the outer edge of the second thick film portion 62 is 1 to 3 μm.

The light-shielding layer BM includes a first light-shielding portion BM1 overlapping the first thick film portion 61 and extending in the first direction X, a second light-shielding portion BM2 overlapping the metal lines ML1 to ML3 and extending in the second direction Y, and a light-shielding extended portion BM3 located at an intersection of the first light-shielding portion BM1 and the second light-shielding portion BM2 which overlaps with the metal line ML2. The first light-shielding portion BM1 also overlaps with the scanning line G2 and the metal electrodes ME1 and ME2. The second light-shielding portion BM2 also overlaps with the signal lines S1 to S3 shown in FIG. 5. In addition, the second portion PT2 of each of the metal lines ML1 to ML3 overlaps with the second light-shielding portion BM2. A width W13 of the first light-shielding portion BM1 along the second direction Y is larger than a width W14 of the second light-shielding portion BM2 along the first direction X. The light-shielding extended portion BM3 is extended in the second direction Y more than the first light-shielding portion BM1 and is extended in the first direction X more than the second light-shielding portion BM2 in planar view. The area that does not overlap with the first light-shielding portion BM1, the second light-shielding portion BM2, and the light-shielding extended portion BM3 corresponds to a transmissive area of the pixel.

The width W13 of the first light-shielding portion BM1 along the second direction Y is larger than a width W15 of the first thick film portion 61 along the second direction Y. In addition, the end portion 61A and the end portion 61B of the first thick film portion 61 overlap with the first light-shielding portion BM1. That is, the first thick film portion 61 is not exposed from the first light-shielding portion BM1. The first light-shielding portion BM1 includes end portions BMA and BMB extending in the first direction X. The end portion BMA is located on the scanning line G2 side of the contact hole CH11, and the end portion BMB is located on the opposite side of the end portion BMA. A width W21 between the end portion 61A and the end portion BMA is 1 to 3 μm. Similarly, a width W22 between the end portion 61B and the end portion BMB is 1 to 3 μm. The second thick film portion 62 overlaps with the second light-shielding portion BM2. A part of the second thick film portion 62 may be exposed from the second light-shielding portion BM2.

The subspacer SSP overlaps with the first thick film portion 61. The subspacer SSP overlaps with the light-shielding extended portion BM3 and the metal line ML2.

Figure 7:
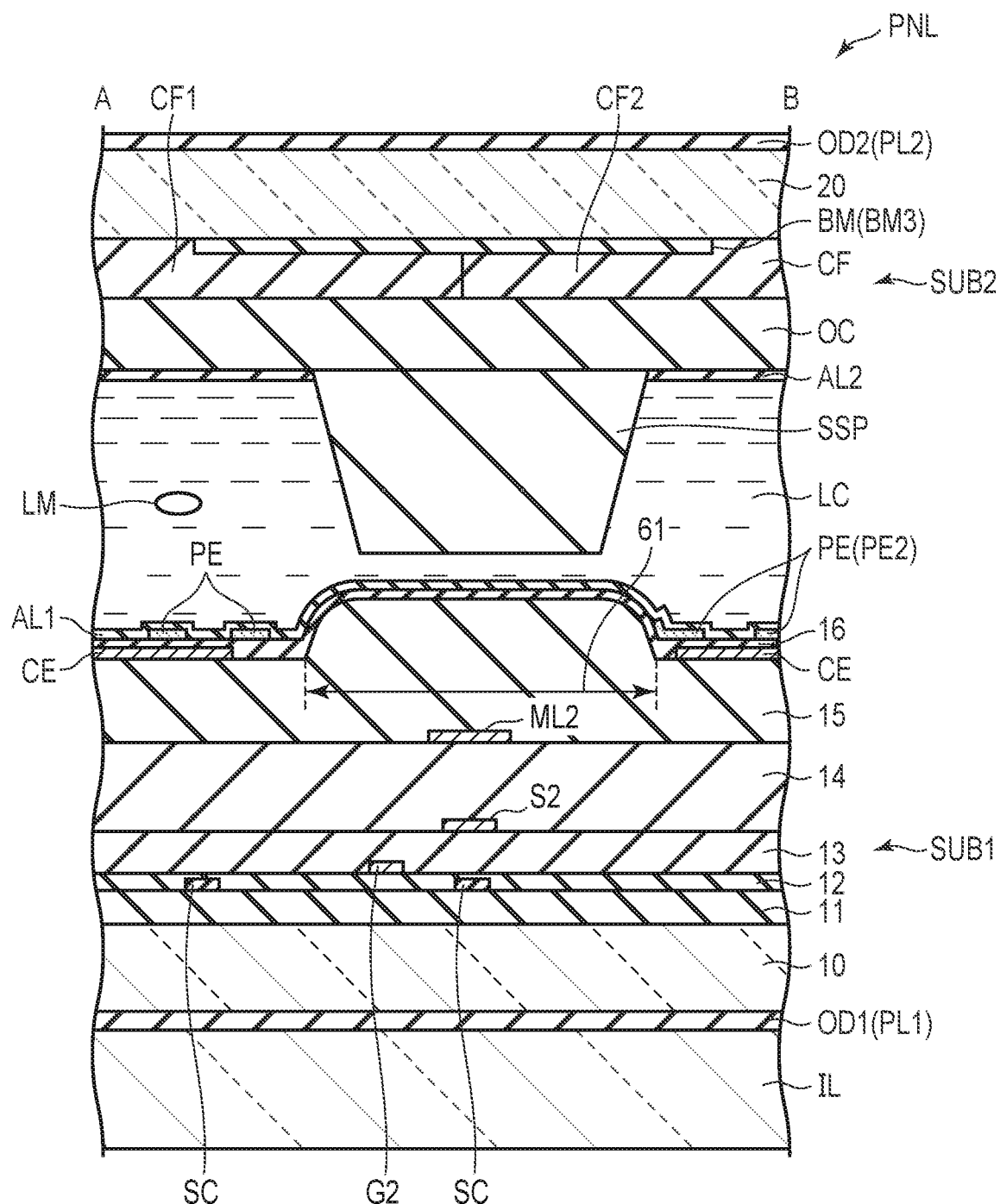
FIG. 7 is a cross-sectional view of a display panel taken along line A-B shown in FIG. 6.

FIG. 7 is a cross-sectional view of the display panel PNL taken along line A-B shown in FIG. 6.

The first substrate SUB1 comprises an insulating substrate 10, insulating films 11 to 16, a semiconductor layer SC, the scanning line G2, the signal line S2, the metal line ML2, the common electrode CE, the pixel electrode PE, and an alignment film AL1.

The insulating substrate 10 is a light transmissive substrate such as a glass substrate or a flexible resin substrate. The insulating film 11 is located on the insulating substrate 10. The semiconductor layer SC is located on the insulating film 11. The semiconductor layer SC is formed, for example, by polycrystalline silicon, but may also be formed by amorphous silicon or an oxide semiconductor. The insulating film 12 covers the semiconductor layer SC and is located on the insulating film 11.

The scanning line G2 is located on the insulating film 12. The scanning line G2 is formed by metal materials such as aluminum (Al), titanium (Ti), silver (Ag), molybdenum (Mo), tungsten (W), copper (Cu), chromium (Cr), etc., or an alloy combining these metal materials. It may be a single-layer structure or a multi-layer structure. In one example, the scanning line G2 is formed of a molybdenum-tungsten alloy. The insulating film 13 covers the scanning line G2 and is located on the insulating film 12.

The signal line (first signal line) S2 is located on the insulating film 13. The signal line S2 is formed by metal materials such as aluminum (Al), titanium (Ti), silver (Ag), molybdenum (Mo), tungsten (W), copper (Cu), chromium (Cr), etc., or an alloy combining these metal materials. It may be a single-layer structure or a multi-layer structure. In one example, the signal line S2 is a stacked layer body in which a first layer containing titanium (Ti), a second layer containing aluminum (Al), and a third layer containing titanium (Ti) are stacked in this order. The insulating film (first insulating film) 14 covers the signal line S2 and is located on the insulating film 13.

The metal line (first metal line) ML2 is located on the insulating film 14. The metal line ML2 is formed by the above metal materials or an alloy combining the above metal materials, and may be a single-layer structure or a multi-layer structure. In one example, the metal line ML2 is a stacked layer body in which a first layer containing titanium (Ti), a second layer containing aluminum (Al), and a third layer containing titanium (Ti) are stacked in this order, or a stacked layer body in which a first layer containing molybdenum (Mo), a second layer containing aluminum (Al), and a third layer containing molybdenum (Mo) are stacked in this order. The insulating film (second insulating film) 15 covers the metal line ML2 and is located on the insulating film 14. The insulating film 15 protrudes toward the second substrate SUB2 at the first thick film portion 61.

The common electrode CE is located on the insulating film 15. The common electrode CE is a transparent electrode formed by a transparent conductive material such as indium tin oxide (ITO) or indium zinc oxide (IZO). The insulating film (third insulating film) 16 covers the common electrode CE and is located on the insulating film 15. The insulating film 16 covers the first thick film portion 61.

The pixel electrode PE is located on the insulating film 16. The pixel electrode PE is a transparent electrode formed by a transparent conductive material such as ITO or IZO. The alignment film AL1 covers the pixel electrode PE and is located on the insulating film 16. The alignment film AL1 covers the first thick film portion 61 via the insulating film 16.

The insulating films 11 to 13 and the insulating film 16 are inorganic insulating films formed by inorganic insulating materials such as silicon oxide, silicon nitride, silicon oxynitride, etc., and may be a single-layer structure or a multi-layer structure. The insulating films 14 and 15 are organic insulating films formed by, for example, organic insulating materials such as acrylic resin.

The second substrate SUB2 comprises an insulating substrate 20, the light-shielding layer BM, the color filter layer CF, an overcoat layer OC, the subspacer SSP, and an alignment film AL2.

Similar to the insulating substrate 10, the insulating substrate 20 is a light transmissive substrate such as a glass substrate or a resin substrate. The light-shielding layer BM and the color filter layer CF are located on a side of the insulating substrate 20 facing the first substrate SUB1. The color filter layer CF includes a color filter CF1 of a first color and a color filter CF2 of a second color. The color filter layer CF further includes a color filter of a third color, which is not shown in the drawing. The first color, the second color, and the third color are different from each other. In one example, the first, the second, and the third colors are one of red, green, and blue.

The overcoat layer OC covers the color filter layer CF. The overcoat layer OC is formed by a transparent resin. The subspacer SSP is provided under the overcoat layer OC and protrudes toward the first substrate SUB1. The subspacer SSP is separated from the first substrate SUB1. The alignment film AL2 covers the overcoat layer OC. The alignment films AL1 and AL2 are formed, for example, by a material that exhibits horizontal alignment property.

The above-described first substrate SUB1 and second substrate SUB2 are disposed so that the alignment films AL1 and AL2 face each other. The first substrate SUB1 and the second substrate SUB2 are bonded by sealing in a state where a predetermined cell gap is formed. The liquid crystal layer LC is located between the first substrate SUB1 and the second substrate SUB2. The liquid crystal layer LC comprises liquid crystal molecules LM. The liquid crystal layer LC is configured by a positive type (positive dielectric constant anisotropy) liquid crystal material or a negative type (negative dielectric constant anisotropy) liquid crystal material.

An optical element OD1 including a polarizing plate PL1 is bonded to the insulating substrate 10. An optical element OD2 including a polarizing plate PL2 is bonded to the insulating substrate 20. Note that the optical elements OD1 and OD2 may also comprise retardation plates, scattering layers, anti-reflection layers, etc., as necessary.

In such a display panel PNL, in an off-state where no electric field is formed between the pixel electrode PE and the common electrode CE, the liquid crystal molecules LM are initially aligned in a predetermined direction between the alignment films AL1 and AL2. In such an off-state, the light irradiated from an illumination device IL toward the display panel PNL is absorbed by the optical elements OD1 and OD2, resulting in a dark display. On the other hand, in an on-state where an electric field is formed between the pixel electrode PE and the common electrode CE, the liquid crystal molecules LM are aligned in a direction different from the initially aligned direction by the electric field, and the alignment direction is controlled by the electric field. In such an on-state, a part of the light from the illumination device IL passes through the optical elements OD1 and OD2, resulting in a bright display.

A first effect of the present embodiment will now be explained.

Figure 8:
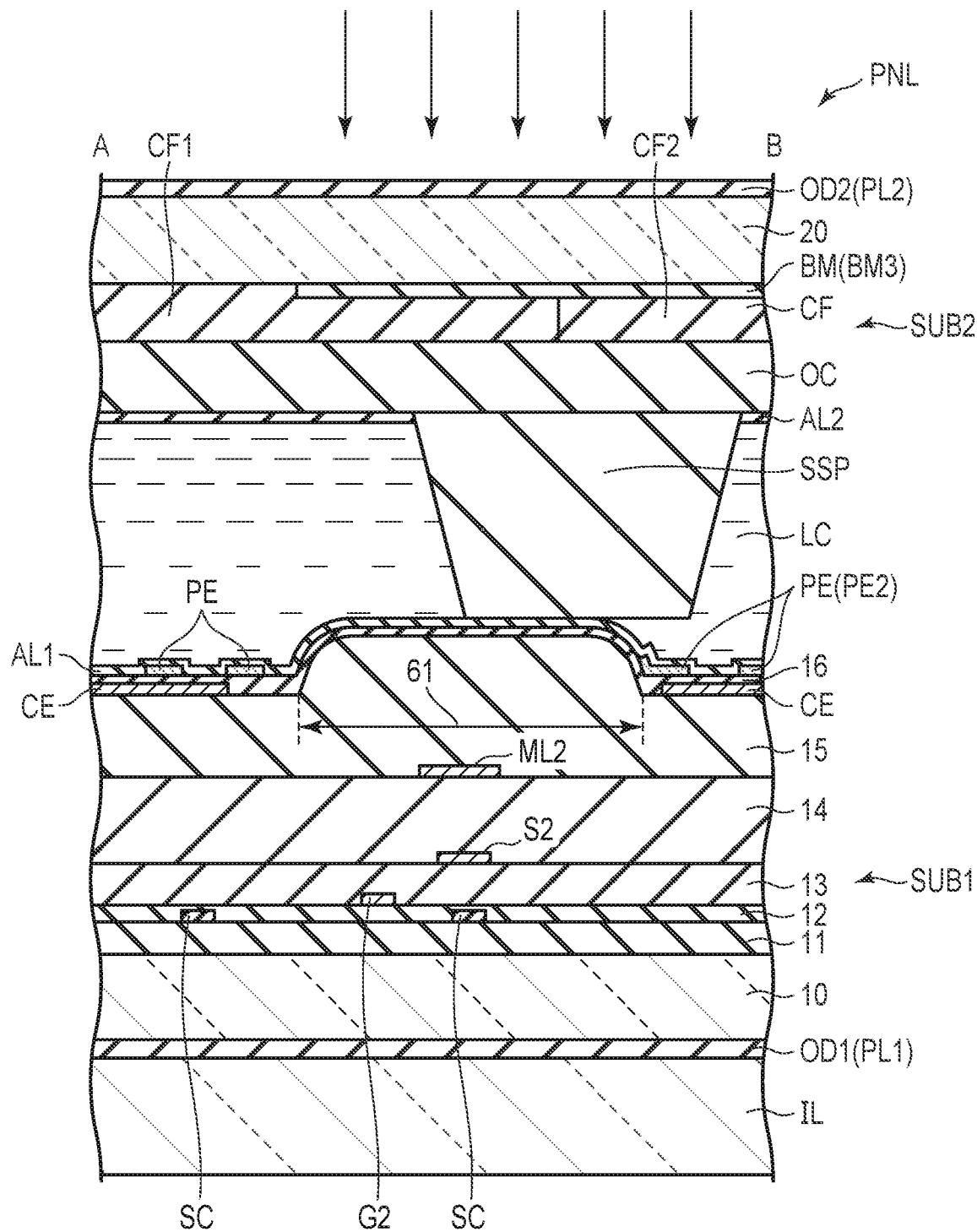
FIG. 8 is a cross-sectional view showing a state in which an external force is applied to the display panel shown in FIG. 7.

FIG. 8 is a cross-sectional view showing a state in which an external force is applied to the display panel PNL shown in FIG. 7. In the drawing, the external force is indicated by arrows.

In some cases, the display panel PNL may be bent by an external force and cause the subspacer SSP to scratch and damage the alignment film AL1 in the lateral direction. In the area where the alignment film AL1 is damaged, alignment disorder occurs in which the alignment of the liquid crystal molecules differs from the desired alignment. When the subspacer SSP is returned to its original position, in a case where the area in which the alignment disorder has occurred does not overlap with the light-shielding layer BM, light leakage of the display panel PNL occurs. In addition, if the light-shielding layer BM is extended to cover the damaged portion of the alignment film AL1, the transmittance of the pixels will be reduced.

According to the present embodiment, the first substrate SUB1 comprises the first thick film portion 61 formed on the insulating film 15. The subspacer SSP faces the first thick film portion 61. Therefore, when an external force is applied to the display panel PNL, as is shown in FIG. 8, the subspacer SSP abuts the first substrate SUB1 on the first thick film portion 61, but is separated from the first substrate SUB1 at a position where it does not overlap with the first thick film portion 61. In other words, this allows the alignment film AL1 from being damaged by the subspacer SSP outside the first thick film portion 61. Accordingly, the area in which the subspacer SSP may damage the alignment film AL1 can be reduced. Therefore, the area of the light-shielding extended portion BM3 for covering the damaged area of the alignment film AL1 can be reduced, thereby improving the transmittance of the pixel.

In some cases, in the configuration of the present embodiment, the alignment film AL1 located on the first thick film portion 61 may be damaged. Therefore, as shown in FIG. 6, the first light-shielding portion BM1 covers the first thick film portion 61. Therefore, the light leakage of the display panel PNL due to the alignment disorder on the first thick film portion 61 can be suppressed.

Figure 9:
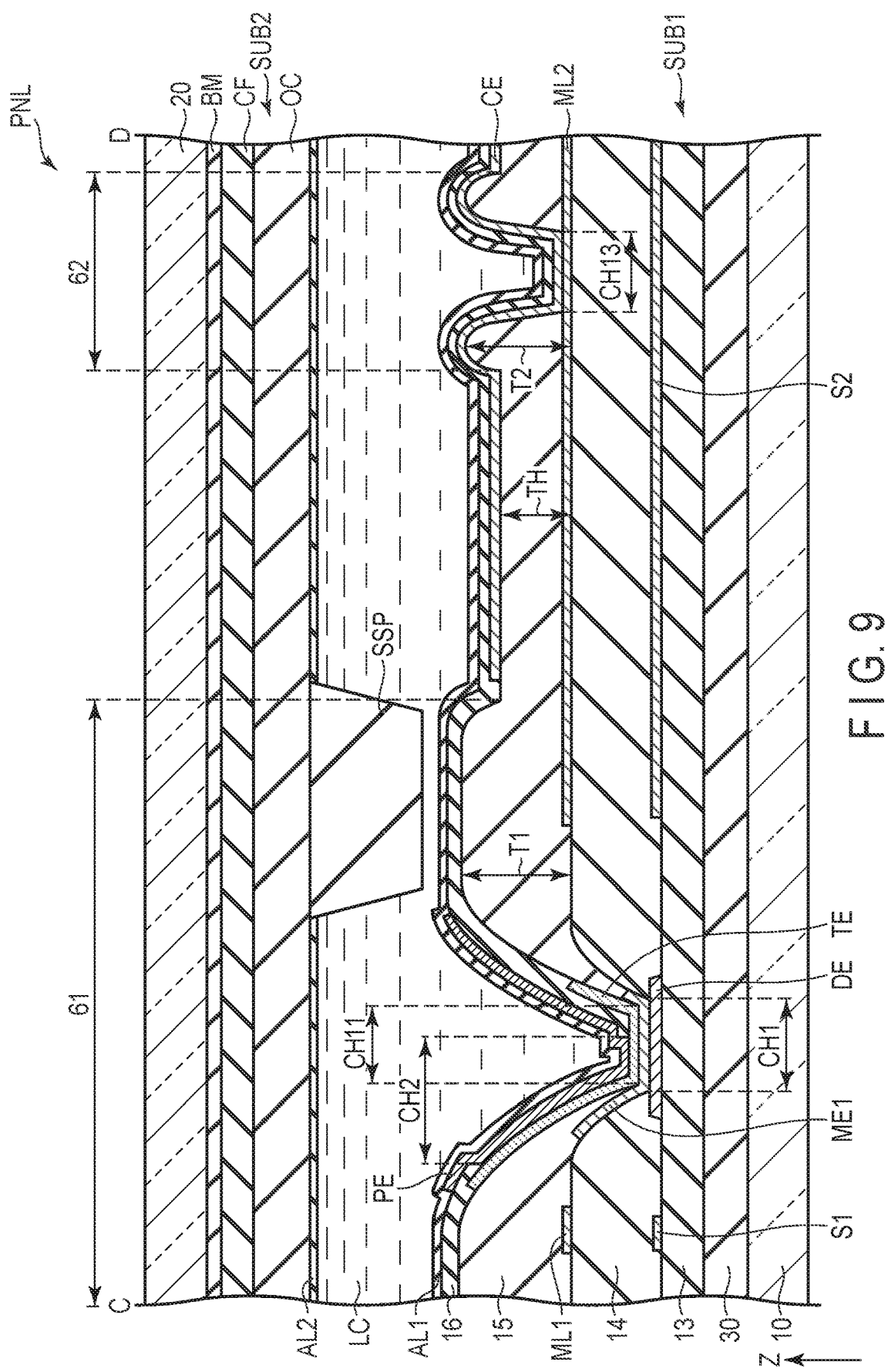
FIG. 9 is a cross-sectional view of the display panel taken along line C-D shown in FIG. 6.

FIG. 9 is a cross-sectional view of the display panel PNL taken along line C-D shown in FIG. 6. Note that, in FIG. 9, the layer between the insulating substrate 10 and the insulating film 13 is collectively referred to as a configuration layer 30. The configuration layer 30 includes the above-mentioned insulating films 11 and 12, semiconductor layer SC, and scanning line G2, etc.

In addition to the above-mentioned configuration, the first substrate SUB1 comprises the signal line S1, a drain electrode DE, the metal line ML1, the metal electrode ME1, and a transparent electrode TE, etc. The drain electrode DE and the signal lines S1 and S2 are located on the insulating film 13 and covered by the insulating film 14. The drain electrode DE is formed by the same material as the signal lines S1 and S2. The drain electrode DE is disposed between the signal lines S1 and S2.

The metal electrode ME1 and the metal lines ML1 and ML2 are located on the insulating film 14 and covered by the insulating film 15. The metal electrode ME1 is formed by the same material as the metal lines ML1 and ML2. The metal electrode ME1 is in contact with the drain electrode DE at the contact hole CH1 formed in the insulating film 14. The contact hole CH1 penetrates the insulating film 14 to the drain electrode DE.

The transparent electrode TE and the common electrode CE are located on the insulating film 15 and covered by the insulating film 16. The transparent electrode TE is formed by the same material as the common electrode CE. The transparent electrode TE is in contact with the metal electrode ME1 at the contact hole CH11 formed in the insulating film 15. The common electrode CE is in contact with the metal line ML2 at the contact hole CH13 formed in the insulating film 15. The contact hole CH11 penetrates the first thick film portion 61 to the metal electrode ME1. The contact hole CH13 penetrates the second thick film portion 62 to the metal line ML2. The common electrode CE overlaps with the second thick film portion 62.

The pixel electrode PE is located on the insulating film 16 and covered by the alignment film AL1. The pixel electrode PE is in contact with the transparent electrode TE at the contact hole (third contact hole) CH2 formed in the insulating film 16. The contact hole CH2 penetrates the insulating film 16 to the transparent electrode TE. The drain electrode DE, the metal electrode ME1, the transparent electrode TE, and the pixel electrode PE overlap in the third direction Z.

The first thick film portion 61 has a first thickness T1. The second thick film portion 62 has a second thickness T2. The insulating film 15 has a film thickness TH between the first thick film portion 61 and the second thick film portion 62. The first thickness T1 and the second thickness T2 are each larger than the film thickness TH. The first thickness T1 corresponds to a gap between the highest position of the first thick film portion 61 and the insulating film 14. The second thickness T2 corresponds to a gap between the highest position of the second thick film portion 62 and the insulating film 14. The first thickness T1 and the second thickness T2 are equal to each other.

A second effect of the present embodiment will now be explained.

The contact holes CH11 and CH13 are collectively formed by forming a mask with holes on the insulating film 15 and then exposing it. However, for example, in a case where the thickness of the insulating film 15 is different at positions where the respective contact holes CH11 and CH13 are to be formed, the amount of exposure required to form the respective contact holes CH11 and CH13 will be different. Therefore, if the exposure is made in accordance with the film thickness of a position where one of the contact holes is to be formed, problems such as deformation, non-penetration, and dimensional deviation and variation may occur for the other contact hole.

According to the present embodiment, the second thick film portion 62 is formed at a position where the contact hole CH13 is formed. In addition, the first thickness T1 of the first thick film portion 61 and the second thickness T2 of the second thick film portion 62 are equal to each other. Therefore, even if the contact holes CH11 and CH13 are formed with the same amount of exposure, it is possible to suppress the deformation, non-penetration, and dimensional deviation and variation, etc., of the contact hole.

Note that, in the present embodiment, the first thick film portion 61 and the second thick film portion 62 are formed on an organic insulating film; however, it is not limited to this example, and the first thick film portion 61 and the second thick film portion 62 can be formed on any inorganic insulating film having a certain film thickness or more. That is, the insulating film 15 may be an inorganic insulating film with a certain film thickness or more. In addition, the first thick film portion 61 and the second thick film portion 62 are disposed in the same pattern as described above even in pixels where the subspace SSP is not disposed.

Figure 10:
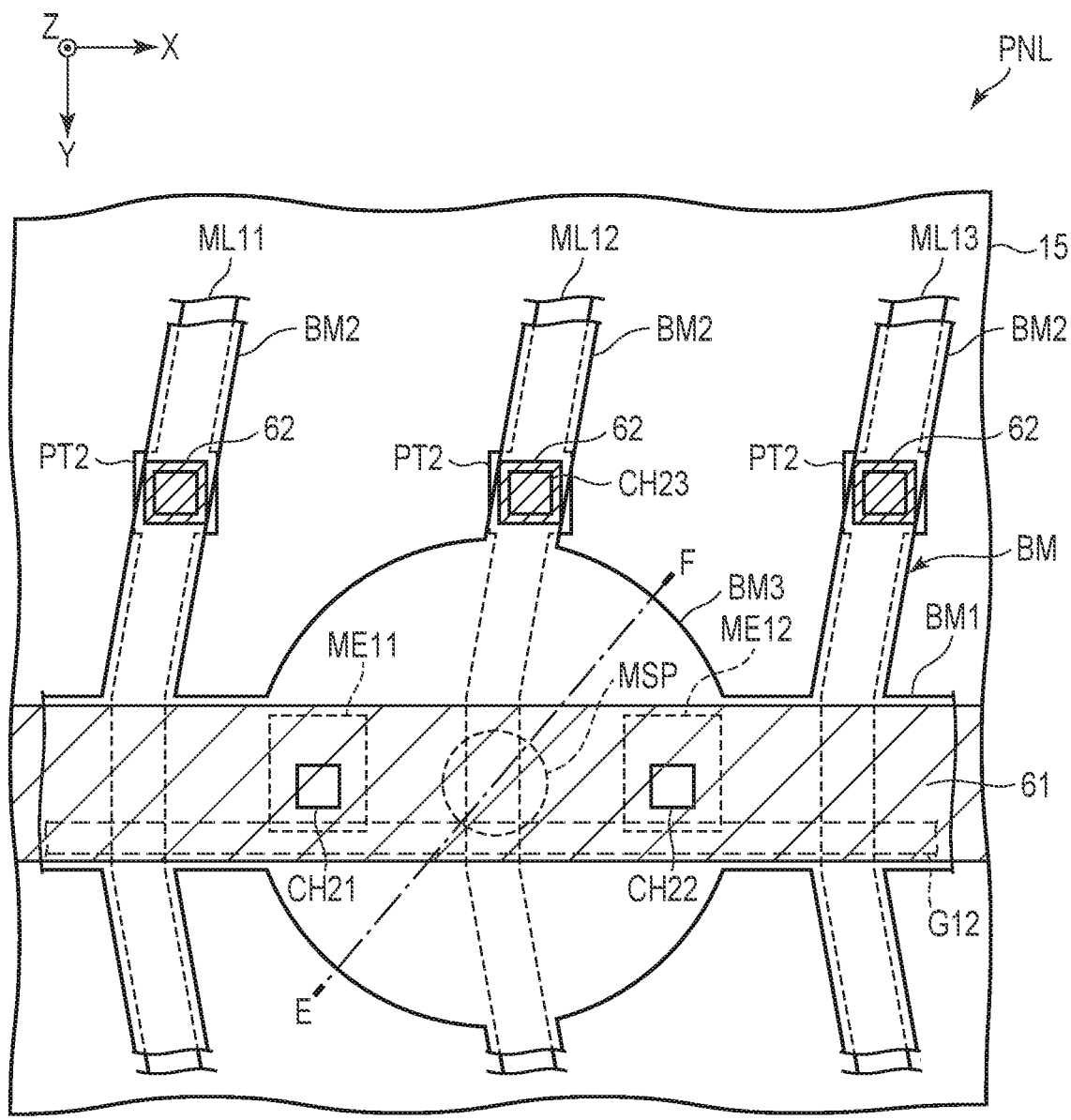
FIG. 10 is a plan view showing the periphery of a main spacer.

FIG. 10 is a plan view showing the periphery of a main spacer MSP. Note that, since the main spacer MSP is disposed at a position different from the subspacer SSP, symbols of members in the periphery of the main spacer MSP are changed. However, the configurations other than the main spacer MSP and the light-shielding extended portion BM3 are the same as those shown in FIG. 6.

The main spacer MSP overlaps with the first thick film portion 61. Furthermore, the main spacer MSP overlaps with the light-shielding extended portion BM3 and the metal line ML12. The area of the light-shielding extended portion BM3 overlapping the main spacer MSP is, for example, formed larger than the area of the light-shielding extended portion BM3 overlapping the subspacer SSP. Furthermore, the area of the main spacer MSP is formed smaller than the area of the subspacer SSP in planar view.

The display panel PNL comprises a plurality of main spacers MSP and a plurality of subspacers SSP. The number of main spacers MSP is smaller than the number of subspacers SSP. In a case where the display panel PNL is used in a personal computer, one main spacer MSP is disposed for, for example, four main pixels. On the other hand, the number of subspacers SSP as shown in FIG. 6 is, for example, disposed six to seven times the number of main spacers MSP. Furthermore, in a case where the display panel PNL is used in a mobile device, one main spacer MSP is disposed for, for example, 16 main pixels. On the other hand, the number of subspacers SSP as shown in FIG. 6 is, for example, disposed 14 to 15 times the number of main spacers MSP. Note that the number of these main spacers MSP and sub-spacers SSP is an example, and may be set in a ratio other than the above.

Figure 11:
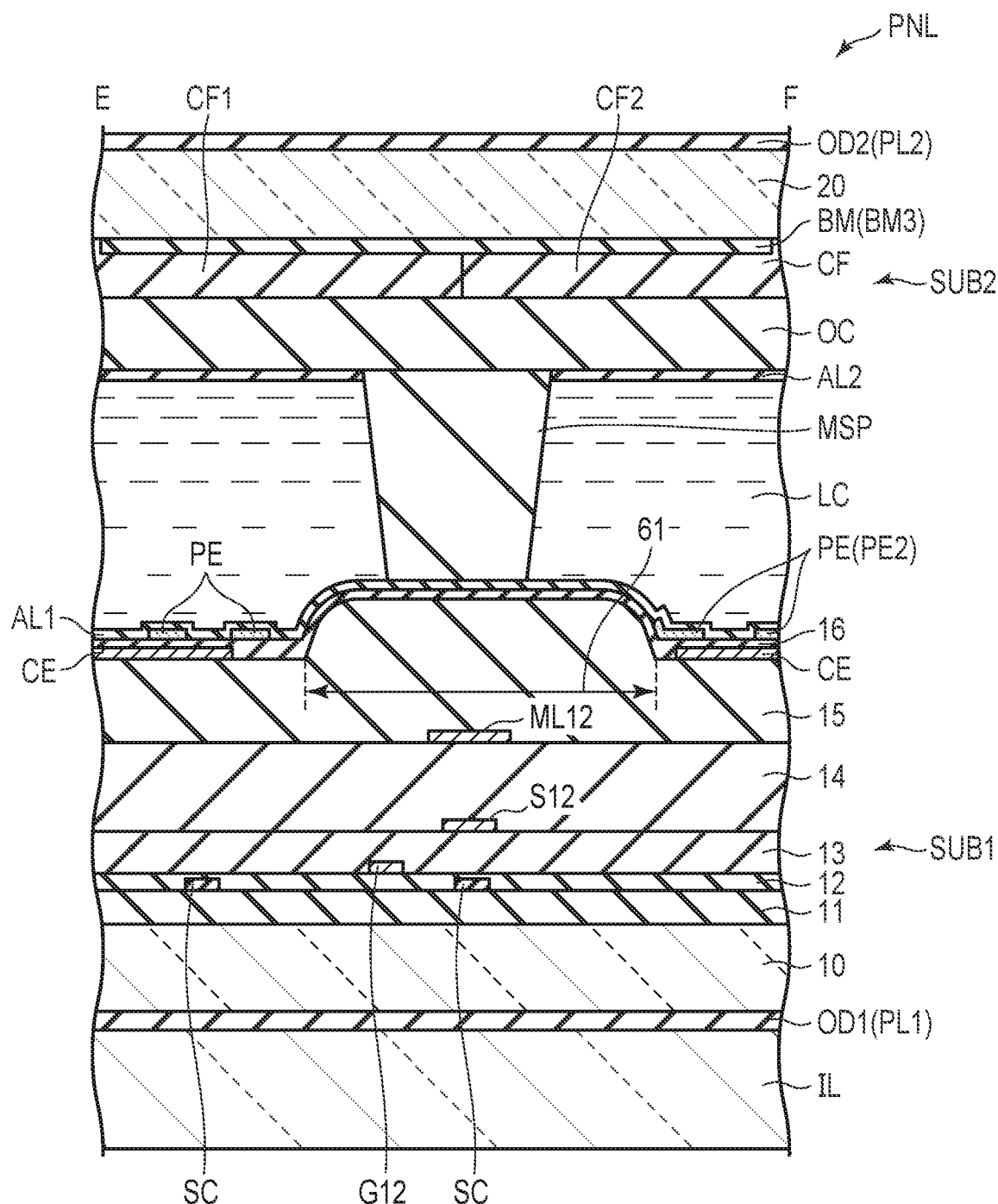
FIG. 11 is a cross-sectional view of the display panel taken along line E-F shown in FIG. 10.

FIG. 11 is a cross-sectional view of the display panel PNL taken along line E-F shown in FIG. 10.

The main spacer MSP is provided under the overcoat layer OC and protrudes toward the first substrate SUB1. The main spacer MSP abuts the first substrate SUB1 in a state where no external force is applied to the display panel PNL. That is, the main spacer MSP is in contact with the alignment film AL1 at a position overlapping the first thick film portion 61.

The same effect as the subspacer SSP described above can be obtained for also the main spacer MSP.

Second Embodiment

Figure 12:
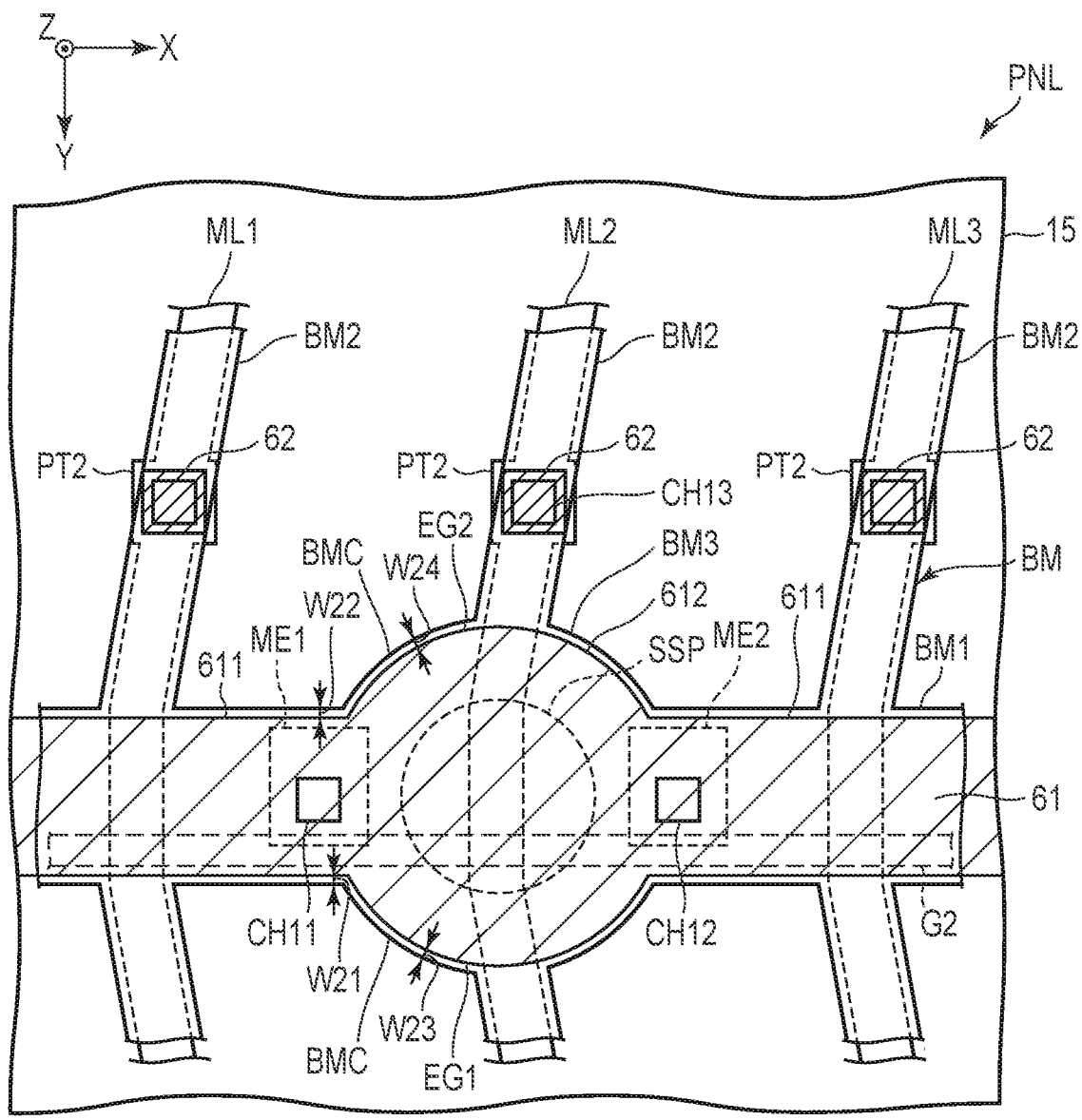
FIG. 12 is a plan view showing the periphery of a subspacer.

FIG. 12 is a plan view of the periphery of a subspacer SSP. The configuration shown in FIG. 12 is different from the configuration shown in FIG. 6 in that a first thick film portion 61 has a thick film extended portion 612.

The first thick film portion 61 has a band-shaped portion 611 that overlaps with a first light-shielding portion BM1 and a thick film extended portion 612 that overlaps with a light-shielding extended portion BM3. The thick film extended portion 612 is extended in the second direction Y more than the band-shaped portion 611 in planar view. The thick film extended portion 612 has a first outer edge EG1 and a second outer edge EG2 located on the opposite side of the first outer edge EG1. In the example shown in the drawing, the first outer edge EG1 and the second outer edge EG2 are arc-shaped in planar view. The first outer edge EG1 and the second outer edge EG2 overlap with the light-shielding extended portion BM3. The subspacer SSP overlaps with the thick film extended portion 612.

The light-shielding extended portion BM3 has an outer edge BMC. A width W23 between the first outer edge EG1 and the outer edge BMC may be equal to or greater than the width W21 shown in FIG. 6. Furthermore, a width W24 between the second outer edge EG2 and the outer edge BMC may be equal to or greater than the width W22 shown in FIG. 6.

Figure 13:
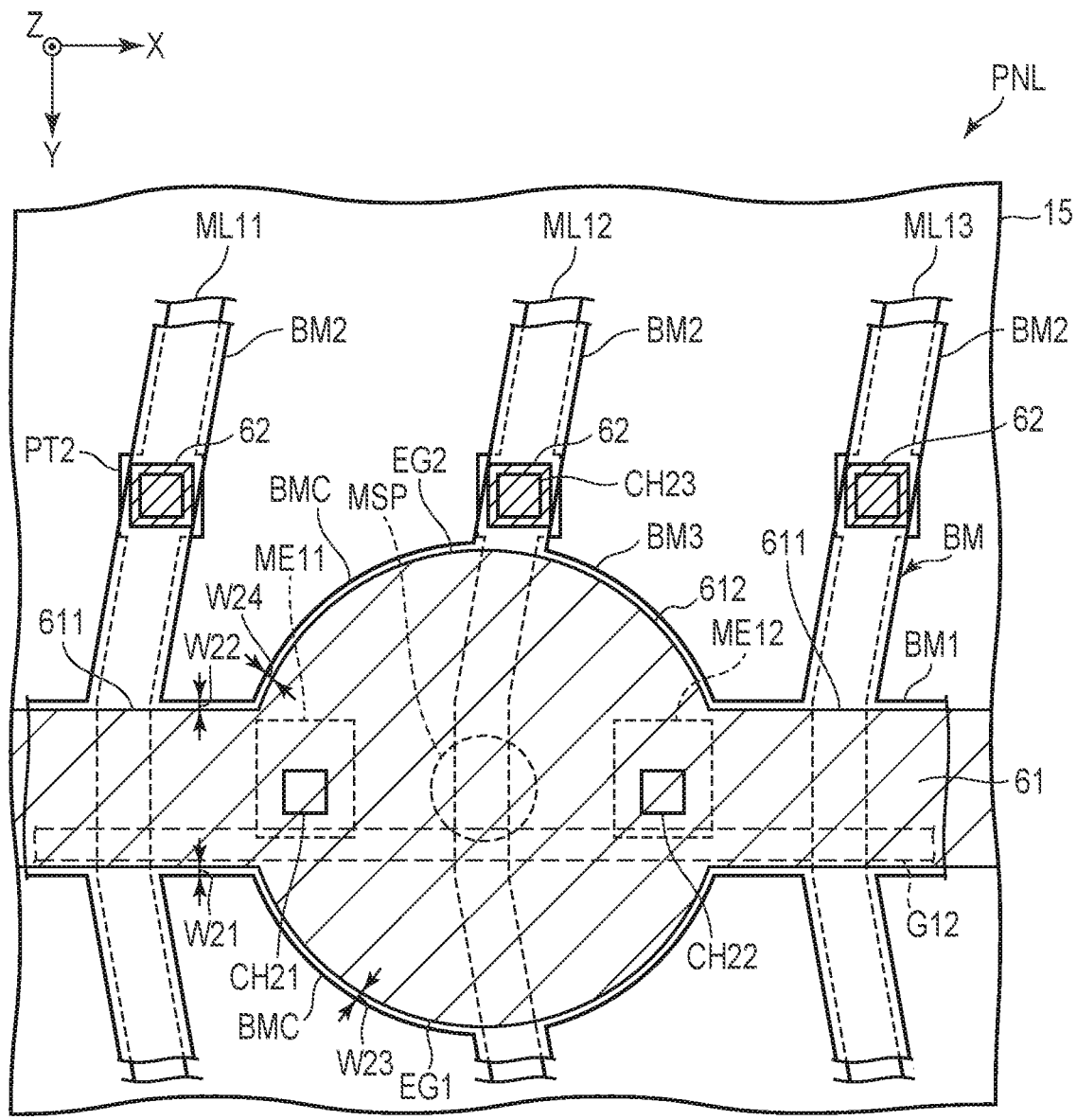
FIG. 13 is a plan view showing the periphery of a main spacer.

FIG. 13 is a plan view of the periphery of the main spacer MSP. The configuration shown in FIG. 13 is different from the configuration shown in FIG. 10 in that the first thick film portion 61 has the thick film extended portion 612. In addition, the configuration shown in FIG. 13 differs from the configuration shown in FIG. 12 mainly in that the areas of the light-shielding portion BM3 and the thick film extended portion 612 are larger.

The main spacer MSP overlaps with the thick film extended portion 612. The thick film extended portion 612 overlaps with metal electrodes ME11 and ME12, and contact holes CH21 and CH22 are formed in the thick film extended portion 612.

The width W23 between the first outer edge EG1 and the outer edge BMC may be equal to or greater than the width W21. Furthermore, the width W24 between the second outer edge EG2 and the outer edge BMC may be equal to or greater than the width W22.

Third Embodiment

Figure 14:
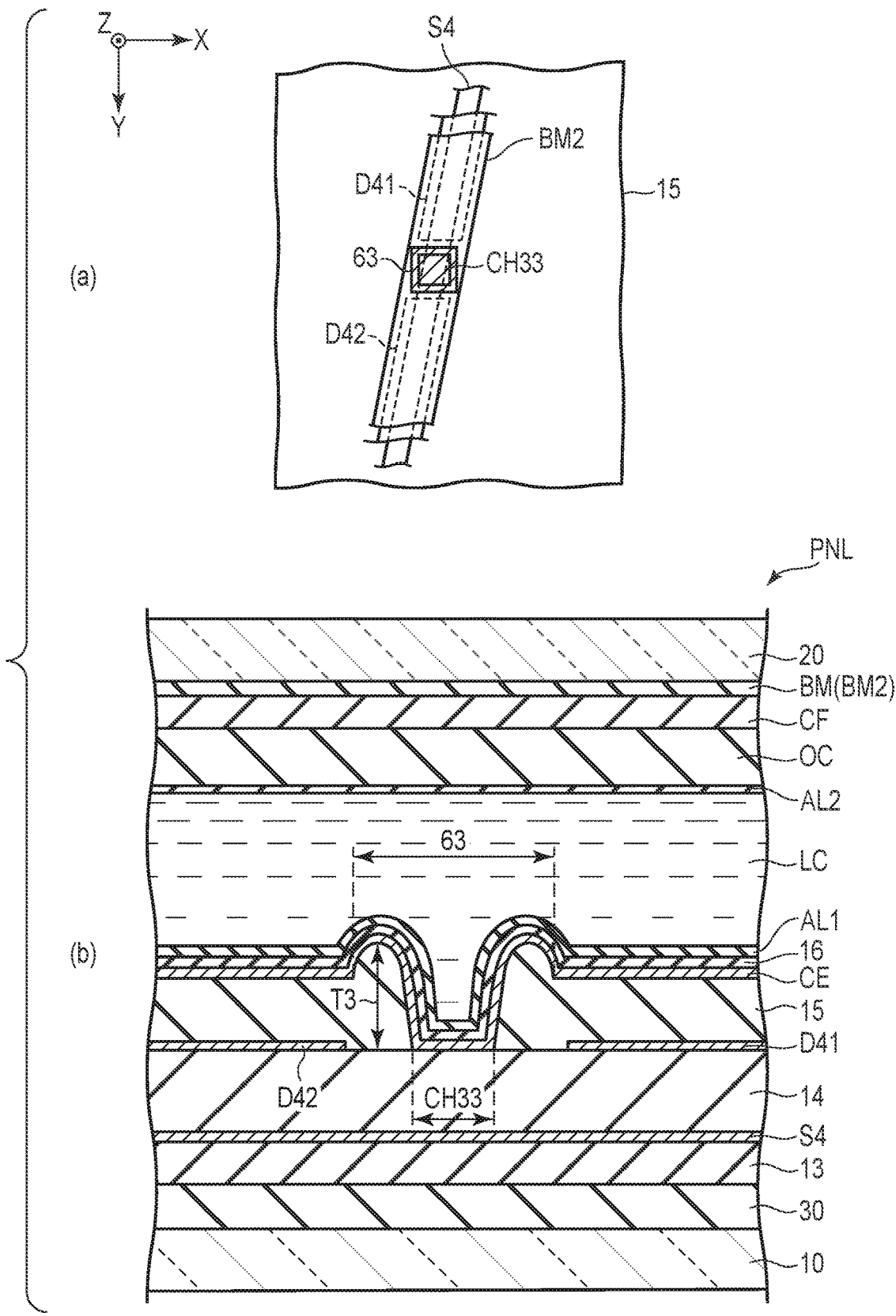
FIG. 14 shows a dummy line.

FIG. 14 shows dummy lines D41 and D42. FIG. 14(a) is a plan view of the dummy lines D41 and D42.
FIG. 14(b) is a cross-sectional view taken along the dummy lines D41 and D42.

As shown in FIG. 14(a), a signal line (second signal line) S4 extends generally in the second direction Y. The dummy lines (first dummy line and second dummy line) D41 and D42 extend in a manner overlapping the signal line S4. An insulating film 15 comprises an island-shaped third thick film portion 63 located between the dummy lines D41 and D42, and a dummy contact hole CH33 overlapping the third thick film portion 63. That is, the dummy contact hole CH33 is located between the dummy lines D41 and D42. A second light-shielding portion BM2 overlaps with the signal line S4, the dummy lines D41 and D42, the third thick film portion 63, and the dummy contact hole CH33.

As shown in FIG. 14(b), the signal line S4 is located on an insulating film 13 and is covered by an insulating film 14. The dummy lines D41 and D42 are disposed between the insulating film 14 and an insulating film 15. The dummy lines D41 and D42 are separated from each other at positions overlapping a common electrode CE. The dummy contact hole CH33 penetrates the third thick film portion 63 to the insulating film 14. The common electrode CE is in contact with the insulating film 14 in the dummy contact hole CH33. The third thick film portion 63 has a third thickness T3. The third thickness T3 is larger than the film thickness TH of the insulating film 15 between the first thick film portion 61 and the second thick film portion 62 shown in FIG. 9. The third thickness T3 corresponds to a gap between the highest position of the third thick film portion 63 and the insulating film 14. The third thickness T3 is equal to the first thickness T1 and the second thickness T2 shown in FIG. 9.

As shown in FIG. 14, by forming the dummy contact hole CH33 even at a point where the common electrode CE is not connected to the metal line, the film thickness can be made uniform when applying the alignment film AL1.

Fourth Embodiment

Figure 15:
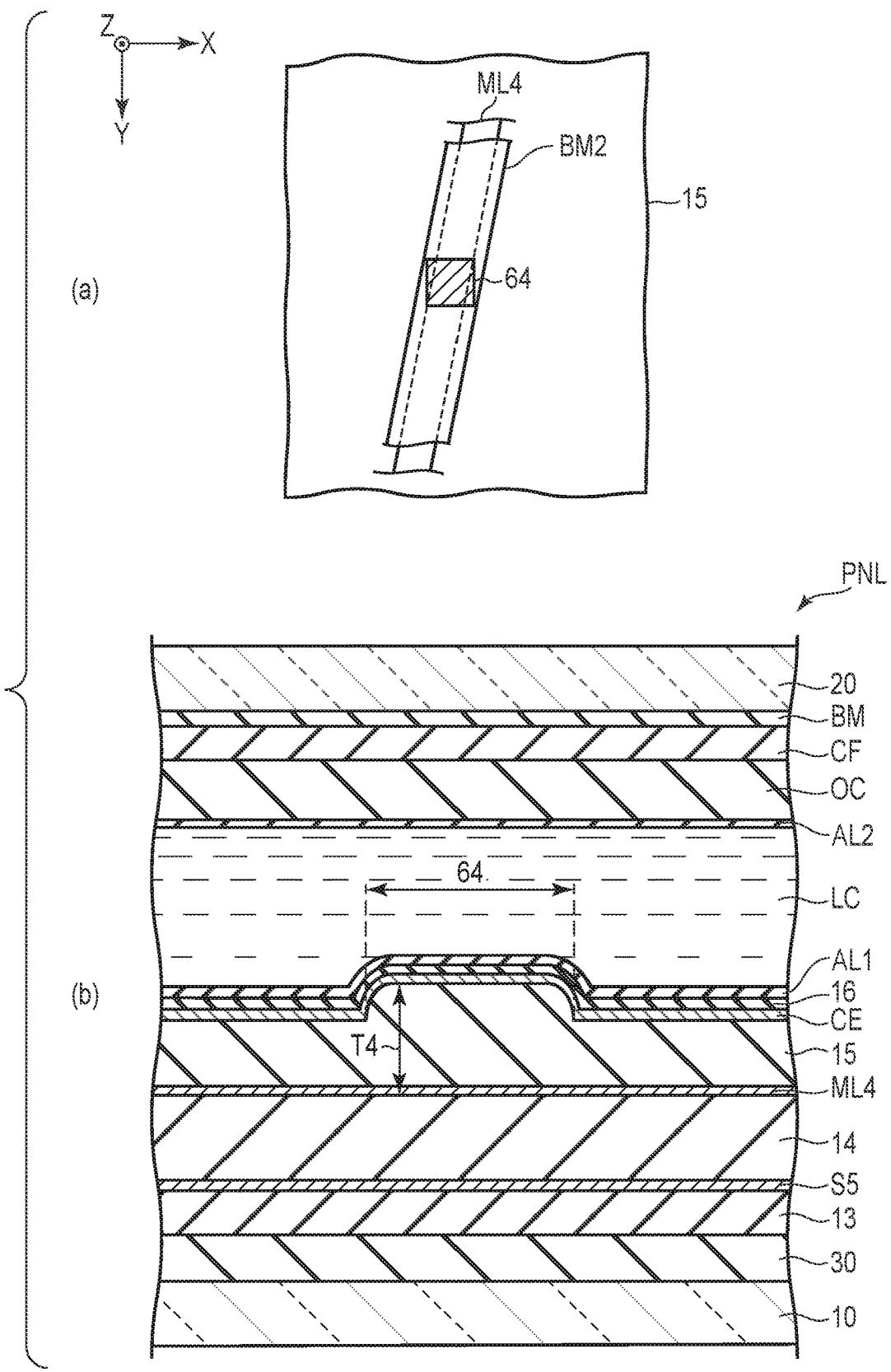
FIG. 15 shows a metal line.

FIG. 15 shows a metal line ML4. FIG. 15(a) is a plan view of the metal line ML4. FIG. 15(b) is a cross-sectional view taken along the metal line ML4.

As shown in FIG. 15(a), the metal line (second metal line) ML4 extends generally in the second direction Y. An insulating film 15 comprises an island-shaped fourth thick film portion 64 that overlaps with the metal line ML4. A second light-shielding portion BM2 overlaps with the metal line ML4 and the fourth thick film portion 64.

As shown in FIG. 15(b), a signal line S5 is located on an insulating film 13 and is covered by an insulating film 14. The metal line ML4 is disposed between the insulating film 14 and an insulating film 15. A common electrode CE overlaps with the fourth thick film portion 64. The common electrode CE and the metal line ML4 are separated from each other in the entire area of the fourth thick film portion 64. The fourth thick film portion 64 has a fourth thickness T4. The fourth thickness T4 is larger than the thickness TH of the insulating film 15 between the first thick film portion 61 and the second thick film portion 62 shown in FIG. 9. The fourth thickness T4 corresponds to a gap between the highest position of the fourth thick film portion 64 and the insulating film 14. The fourth thickness T4 is equal to the first thickness T1 and the second thickness T2 shown in FIG. 9.

As shown in FIG. 15, the fourth thick film portion 64 may be formed even at a point where the common electrode CE is not connected to the metal line ML4.

As explained above, according to the present embodiment, it is possible to obtain a display device capable of improving the transmittance of pixels.

The term "equal thickness" described herein means that the thickness is designed to be equal, and allows for slight differences in thickness that occur in the manufacturing process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
a first substrate, a second substrate facing the first substrate, and a liquid crystal layer located between the first substrate and the second substrate, wherein
the first substrate comprises:
a scanning line extending in a first direction;
a first signal line extending in a second direction intersecting the first direction;
a first insulating film covering the first signal line;
a first metal line disposed on the first insulating film and extending in a manner overlapping the first signal line;
an island-shaped metal electrode disposed on the first insulating film and formed by the same material as the first metal line;
a second insulating film covering the first metal line and the metal electrode;
a common electrode disposed on the second insulating film;
a transparent electrode disposed on the second insulating film and formed by the same material as the common electrode;
a third insulating film covering the common electrode and the transparent electrode; and
a pixel electrode disposed on the third insulating film;

the second insulating film comprises:
a band-shaped first thick film portion extending in the first direction and overlapping the scanning line and the metal electrode;
an island-shaped second thick film portion overlapping the first metal line and the common electrode;
a first contact hole penetrating the first thick film portion to the metal electrode; and
a second contact hole penetrating the second thick film portion to the first metal line,
a first thickness of the first thick film portion and a second thickness of the second thick film portion are larger than a film thickness of the second insulating film between the first thick film portion and the second thick film portion,
the second substrate comprises a spacer that protrudes toward the first substrate and overlaps the first thick film portion, wherein
the transparent electrode is in contact with the metal electrode via the first contact hole,
the common electrode is in contact with the first metal line via the second contact hole, and
the pixel electrode is in contact with the transparent electrode via a third contact hole formed in the third insulating film.

2. The display device of claim 1, wherein the first thickness and the second thickness are equal to each other.

3. The display device of claim 1 further comprising:
a light-shielding layer including a first light-shielding portion overlapping the first thick film portion and extending in the first direction, and a second light-shielding portion overlapping the first metal line and extending in the second direction, wherein
the second thick film portion overlaps with the second light-shielding portion, and
a width along the second direction of the first light-shielding portion is larger than a width along the second direction of the first thick film portion.

4. The display device of claim 3, wherein
the light-shielding layer comprises a light-shielding extended portion located at an intersection of the first light-shielding portion and the second light-shielding portion,
the light-shielding extended portion, in planar view, is extended in the second direction more than the first light-shielding portion and extended in the first direction more than the second light-shielding portion, and
the spacer overlaps with the light-shielding extended portion.

5. The display device of claim 4, wherein
the first thick film portion includes a band-shaped portion overlapping the first light-shielding portion and a thick film extended portion overlapping the light-shielding extended portion,
the thick film extended portion, in planar view, is extended more in the second direction than the band-shaped portion, and includes a first outer edge and a second outer edge located on an opposite side of the first outer edge,
the first outer edge and the second outer edge overlap with the light-shielding extended portion, and
the spacer overlaps with the thick film extended portion.

6. The display device of claim 1, wherein the spacer is separated from the first substrate.

7. The display device of claim 1, wherein the spacer abuts the first substrate.

8. The display device of claim 1 further comprising:
a second signal line extending in the second direction and covered by the first insulating film; and
a first dummy line and a second dummy line disposed between the first insulating film and the second insulating film and extending in a manner overlapping the second signal line, wherein
the second insulating film comprises an island-shaped third thick film portion located between the first dummy line and the second dummy line, and a dummy contact hole penetrating the third thick film portion to the first insulating film,
a third thickness of the third thick film portion is larger than a film thickness of the second insulating film between the first thick film portion and the second thick film portion, and
the common electrode is in contact with the first insulating film in the dummy contact hole.

9. The display device of claim 1 further comprising:
a second metal line disposed between the first insulating film and the second insulating film and extending in the second direction, wherein
the second insulating film comprises an island-shaped fourth thick film portion overlapping the second metal line and the common electrode,
a fourth thickness of the fourth thick film portion is larger than a film thickness of the second insulating film between the first thick film portion and the second thick film portion, and
the common electrode and the second metal line are separated from each other in an entire area of the fourth thick film portion.

10. The display device of claim 1, wherein
the first metal line includes a first portion extending in the second direction and a second portion having a width larger than a width of the first portion in the first direction, and
the second thick film portion overlaps with the second portion.

11. The display device of claim 1, wherein the first insulating film and the second insulating film are formed by an organic insulating material.

* * * * *